United States Patent
Gruson

(10) Patent No.: US 8,690,010 B2
(45) Date of Patent: Apr. 8, 2014

(54) METHOD AND A DEVICE FOR REGULATING PRESSURE IN A VESSEL CONTAINING A LIQUID

(75) Inventor: Bertrand Gruson, Breville/Mer (FR)

(73) Assignee: Serac Group, La Ferte Bernard (FR)

( * ) Notice: Subject to any disclaimer, the term of this patent is extended or adjusted under 35 U.S.C. 154(b) by 1152 days.

(21) Appl. No.: 12/071,237

(22) Filed: Feb. 19, 2008

(65) Prior Publication Data
US 2008/0197147 A1 Aug. 21, 2008

(30) Foreign Application Priority Data
Feb. 20, 2007 (FR) ...................................... 07 01193

(51) Int. Cl.
*B65B 3/14* (2006.01)

(52) U.S. Cl.
CPC ........................................ *B65B 3/14* (2013.01)
USPC ........................ 222/61; 222/394; 251/129.08

(58) Field of Classification Search
USPC .................... 222/61, 394; 137/102, 206, 209; 251/65, 129.08
See application file for complete search history.

(56) References Cited

U.S. PATENT DOCUMENTS

| | | | | | |
|---|---|---|---|---|---|
| 1,548,186 | A | * | 8/1925 | Claude | ............................ 222/23 |
| 2,583,060 | A | * | 1/1952 | Paulsen | ..................... 73/863.61 |
| 3,412,899 | A | * | 11/1968 | Sutter | ........................... 222/595 |
| 3,499,580 | A | * | 3/1970 | Smith | ........................... 222/595 |
| 4,564,046 | A | * | 1/1986 | Lungu | ....................... 137/625.65 |
| 6,561,381 | B1 | * | 5/2003 | Osterheld et al. | .................. 222/1 |
| 2004/0016767 | A1 | * | 1/2004 | Berenshteyn et al. | ............ 222/1 |
| 2005/0006611 | A1 | * | 1/2005 | Choi et al. | ....................... 251/65 |

FOREIGN PATENT DOCUMENTS

| | | |
|---|---|---|
| DE | 155688 | 3/1970 |
| EP | 1275612 A1 | 1/2003 |
| JP | 2006-264755 A | 10/2006 |

* cited by examiner

*Primary Examiner* — J. Casimer Jacyna
(74) *Attorney, Agent, or Firm* — Muncy, Geissler, Olds & Lowe, P.C.

(57) ABSTRACT

The method of regulating pressure in a vessel comprises the steps of feeding the vessel with gas at a given feed rate and of modulating the exhaust rate by means of a valve member placing facing an exhaust orifice and associated with a control member.

10 Claims, 1 Drawing Sheet

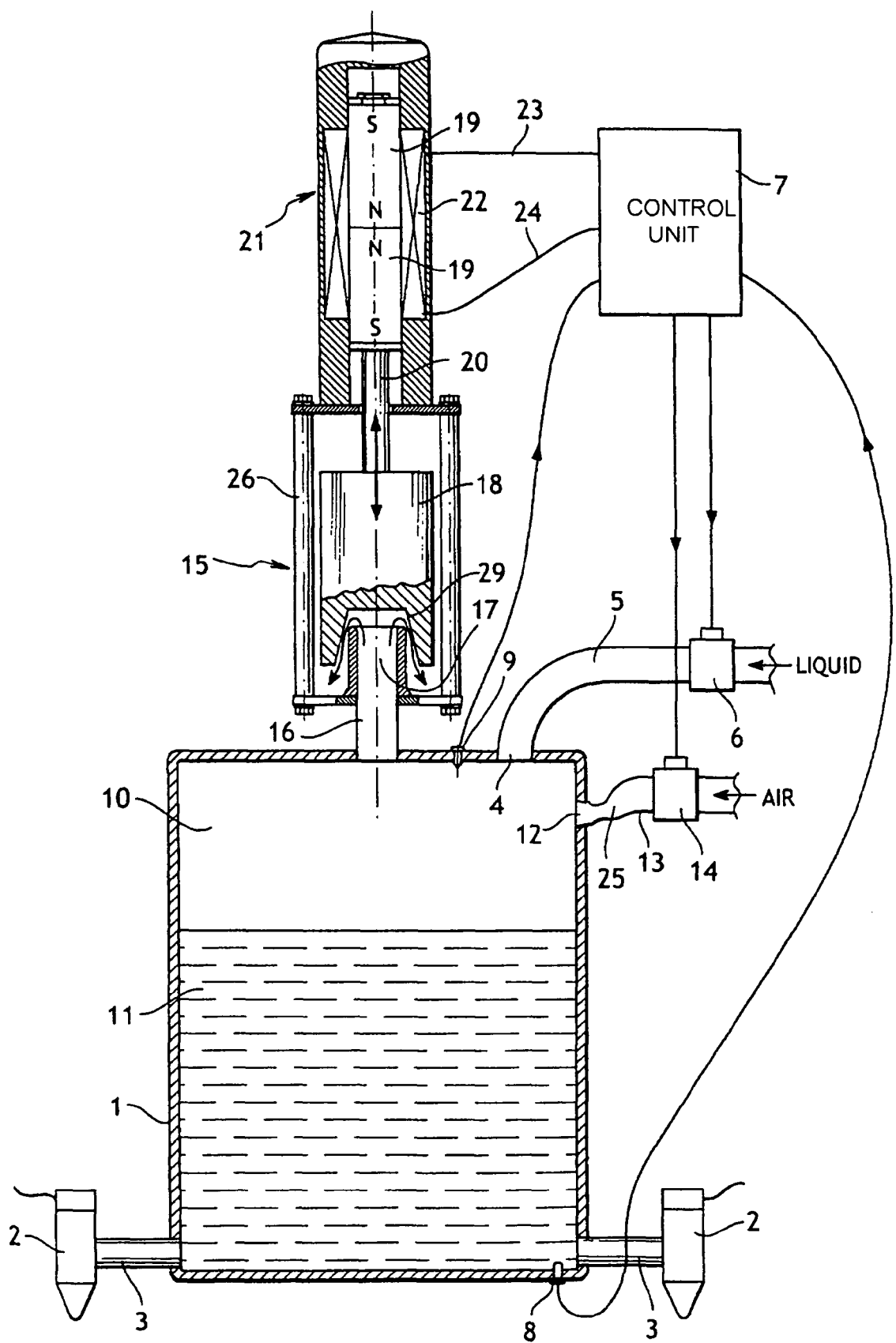

METHOD AND A DEVICE FOR REGULATING PRESSURE IN A VESSEL CONTAINING A LIQUID

The present invention relates to a method and a device for regulating pressure in a vessel containing a liquid, particularly although not exclusively a vessel for feeding an installation for filling receptacles by weight.

BACKGROUND OF THE INVENTION

Installations for filling receptacles by weight are known that comprise filler spouts connected to the bottom of a common feed vessel. When the feed vessel is subjected to atmospheric pressure, the pressure at the bottom of the vessel is given by the depth of liquid in the vessel. In order to obtain a satisfactory flow rate of liquid through a large number of filler spouts while having a feed vessel that presents reasonable dimensions, it is therefore necessary to put the vessel under pressure by injecting compressed air above the liquid.

In order to enable accurate measuring to be performed by a weighing device, it is also desirable for the pressure to be as constant as possible at the inlet to the filler spout. For this purpose, the feed vessel is generally maintained with liquid at a constant level and with the pressure of the compressed air above the liquid being regulated as a function of a setpoint pressure.

In existing devices, this regulation of the pressure of the air above the liquid is performed by means of a servo-valve having an inlet orifice connected to a source of air under pressure, an outlet orifice connected to the feed vessel, and an exhaust orifice connected to the atmosphere. The servo-valve also has a control connection member serving either to close the outlet orifice, or to put the inlet orifice into communication with the outlet orifice, or else to put the outlet orifice into communication with the exhaust orifice. Air pressure in the feed vessel is thus regulated jerkily which runs the risk of leading to a pumping phenomenon.

OBJECT OF THE INVENTION

An object of the invention is to provide a method and a device making it possible to ensure that the pressure in the feed vessel is regulated accurately and smoothly.

SUMMARY OF THE INVENTION

In order to achieve this object, the invention provides a method of regulating pressure in a vessel containing a liquid surmounted by a pressurizing gas, the vessel having a gas feed orifice and a gas exhaust orifice, the method comprising the steps of feeding the vessel with gas at a given flow rate and of modulating the exhaust flow rate as a function of a difference relative to a setpoint pressure.

Thus, the pressure in the tank is a function of the difference between the feed flow rate and the exhaust flow rate, such that modulating the exhaust flow rate makes it possible at will to vary the pressure of the gas inside the vessel in continuous manner.

According to another aspect of the invention, there is provided a device for regulating pressure in a vessel containing a liquid, which device has a gas feed orifice, a gas exhaust orifice, and a modulation member for modulating a differential flow rate between the gas feed rate and the gas exhaust rate.

In an advantageous embodiment of the invention, the modulation member comprises a valve member urged towards a valve seat surrounding the exhaust orifice with a force that is independent of the position of the valve member. Preferably, the modulation member comprises a valve member placed over the seat of the exhaust orifice.

In a preferred embodiment, the valve member is connected to a control member that preferably includes a magnetic core fastened to the valve member and mounted to slide inside a coil.

By appropriately powering the coil, it is then possible to maintain the valve member in levitation between a fluid bearing of compressed air flowing between the valve member and the gas exhaust orifice, and a magnetic bearing that is a function of the current powering the coil.

BRIEF DESCRIPTION OF THE DRAWING

Other characteristics and advantages of the invention appear on reading the following description of a particular, non-limiting embodiment given with reference to the sole accompanying FIGURE which is a diagram of a feed vessel connected to filler spouts and fitted with a pressure regulator device of the invention.

DETAILED DESCRIPTION OF THE INVENTION

With reference to the FIGURE, the filler installation comprises, in conventional manner, a feed vessel 1 having filler spouts 2, only two of which are shown in the FIGURE, connected thereto via ducts 3 that open out into the bottom of the feed vessel 1. The feed vessel 1 is also fitted with a liquid feed orifice 4 connected to a liquid feed duct 5 having mounted therein a valve 6 controlled by a control unit 7 as a function of information provided by a total pressure sensor 8 opening out into the bottom of the vessel, and by a gas pressure sensor 9 opening out into the top of the vessel in the volume of gas 10 overlying the liquid 11.

Likewise in known manner, the vessel is provided with a gas feed orifice 12 connected to a compressed air duct 13 including a controlled expander 14 connected to the control unit 7.

In the invention, the feed vessel 1 is connected to a pressure modulation device given overall reference 15.

In the particular embodiment shown in the FIGURE, the pressure modulation device includes a gas exhaust duct 16 disposed vertically and having a bottom end opening out into the volume of compressed gas 10 in the feed vessel 1. The top end of the exhaust duct 16 defines an exhaust orifice 17 and forms a seat for a valve member constituted by a weight 18 disposed above the valve seat and facing it, and including a cavity 29 that fits over the valve seat. The side wall of the cavity 29 is preferably frustoconical so as to enable exhaust gas to escape via the exhaust orifice 17 while serving to center the valve member 18 while it is moving.

In its top portion, the valve member 18 is connected to a rod 20 connecting it to a control member given overall reference 21. In the embodiment shown, the control member 21 comprises a magnetic core made up of two permanent magnets 19 disposed to generate magnetic flux that is coaxial with a coil 22 that surrounds the permanent magnets 19. The coil 22 is mounted on a stationary structure 26 that is rigidly secured to the exhaust duct 16. The permanent magnets 19 are preferably mounted so that they have same-polarity ends facing each other. The coil 22 has a top end connected to a control unit via a connection electric wire 23 and the opposite end of the coil is connected to the control unit via a connection electric wire 24.

The compressed gas feed duct 13 also includes a calibrated orifice 25 enabling the vessel 1 to be fed with gas under pressure at a precise given rate that is a function of the pressure set by the expander 14.

When the installation is started, the feed vessel 1 is filled with liquid for packaging until the liquid reaches a level that is kept constant in known manner by controlling the valve 6 as a function of signals delivered by the pressure sensor 8. Thereafter, the coil 22 is fed with direct current (DC) in an appropriate direction for the resulting magnetic force on the permanent magnets 19 to add to the weight of the valve member 18 so as to press it against the seat surrounding the exhaust orifice 17.

The air under pressure is admitted via the gas feed orifice 12, and as the pressure in the volume 10 rises, the current fed to the coil 22 is modified by the control unit 7 as a function of pressure information given by the gas pressure sensor 9 so as to modulate the rate of exhaust through the exhaust orifice 17 as a function of a difference relative to a pressure setpoint stored in the control unit 7.

The level of the liquid continues to be kept constant by controlling the valve 6 as a function of a difference between the signals delivered by the pressure sensors 8 and 9.

When the coil 22 is not powered, the force applied on the valve member is independent of the position thereof and is a function of the total combined weight of the weight 18 and of the permanent magnets 19 that are associated therewith. In a preferred embodiment of the invention, the weight 18 and the permanent magnets 19 associated therewith are dimensioned so that when the pressure in the volume 10 of the vessel 1 is equal to the setpoint pressure, the weight of the valve member plus the elements that are associated therewith balances the pressure that results from the rate at which the gas is flowing through the exhaust orifice 17, without it being necessary to power the coil 22. This minimizes the extent to which the coil 22 heats up and also minimizes electricity consumption. The coil 22 and the magnetic core are then preferably placed in the position shown in the FIGURE such that the midplane between the facing poles of the permanent magnets coincides with a half-height plane of the coil. When the pressure in the volume 10 varies, the magnetic core moves away from this position. The coil is then powered with a current flowing in the appropriate direction to modulate the flow of gas through the exhaust orifice 17 in such a manner as to correct the pressure difference relative to the setpoint pressure. Because the magnetic fluxes from the permanent magnets 19 are in opposite directions, one of the permanent magnets is then subjected to a traction force, while the other permanent magnet is subjected to a repulsion force, such that the magnetic core is subjected to a force that is twice the force that would be obtained using a magnetic core having a single permanent magnet extending through the coil. In addition, given that the movements performed by the valve member in order to regulate pressure are small, this structure makes it possible to exert a return force on the valve member that is independent of its position.

When it is desired to empty the feed vessel 1 completely, the control for maintaining the liquid level therein is interrupted, and the setpoint pressure for the volume 10 is increased progressively so as to compensate for the decreasing depth of liquid in the vessel.

Naturally, the invention is not limited to the embodiment described and variant embodiments can be applied thereto without going beyond the ambit of the invention as defined by the claims.

In particular, the device as described can be made with a single permanent magnet, or even without any permanent magnet. When there is no permanent magnet, the position of the core in the coil is then given merely by the magnitude of the current being fed to the coil. Under such circumstances, it is preferable to provide for the core to be shorter than the coil so that the position of the core in the coil enables a significant magnetic force to be exerted on the core in addition to or opposing the force represented by the weight 18. The disposition of the invention can also be implemented using a plurality of coils that are powered independently so as to exert appropriate forces on the magnetic core. The coil 22 may also be replaced by some other magnetic attraction member, such as a magnetized ring associated with a drive member that is controlled by the control unit 7.

The total pressure sensor may be placed other than in the bottom of the feed vessel in order to take account of some particular configuration of the installation. In particular, when the filler spouts 2 are not connected to the tank directly, but via a manifold, the sensor 8 is preferably secured to the manifold so that the total pressure as measured takes account of the head loss in the pipe connecting the manifold to the vessel 1.

Control by means of a magnetic device can be replaced by control by means of a pneumatic or hydraulic actuator that also provides the return force that is independent of the position of the valve member, unlike a return spring for which the force varies with the extent of which it is under compression or traction.

In order to perform the beginning and the end of a cycle more quickly, provision may also be made to modulate the feed flow rate as a function of a difference relative to the setpoint pressure by using a calibrated orifice of variable size or by causing the feed pressure to vary by means of the expander 14.

What is claimed is:

1. A pressure regulation device for regulating pressure in a vessel containing a liquid surmounted by a pressurizing gas, the device comprising:
    a gas feed orifice for feeding the vessel with gas at a constant given flow rate;
    a gas exhaust orifice;
    a pressure modulation member which is controlled by a control unit so as to modulate only an exhaust flow rate through the exhaust orifice as a function of a difference relative to a setpoint pressure stored in the control unit, the feed flow rate being unmodulated;
    a valve member placed facing the gas exhaust orifice and connected to a control member exerting a force on the valve member that is independent of its position;
    wherein the valve member includes a weight that includes a cavity, the cavity fitting over a valve seat formed by the gas exhaust orifice.

2. A pressure regulation device according to claim 1, wherein the modulation member comprises a valve member disposed over a valve seat surrounding the exhaust orifice.

3. A pressure regulation device according to claim 2, wherein the valve member is connected to a control member.

4. A pressure regulation device according to claim 3, wherein the control member comprises a magnetic core fastened to the valve member and associated with a magnetic attraction member.

5. A pressure regulation device according to claim 4, wherein the magnetic core comprises at least one permanent magnet having a field that is coaxial with the magnetic attraction member.

6. The pressure regulation device according to claim 1, further comprising:
    a gas pressure sensor that is mounted on the top of the vessel in the volume of gas overlying the liquid, the control unit receiving gas pressure information from the gas pressure sensor so that the control unit controls the pressure modulation member to modulate only an exhaust flow rate through the exhaust orifice, in view of the gas pressure information and the gas pressure setpoint stored in the control unit.

7. The pressure regulation device according to claim 1, wherein the cavity is frustoconical so as to enable exhaust gas to escape via the exhaust orifice while serving to center the weight while it is moving.

8. The pressure regulation device according to claim 1, wherein the control member comprises a magnetic core fastened to the valve member and associated with a magnetic attraction member; and
   wherein, the weight and the magnetic core associated therewith are dimensioned so that when the pressure in the volume of the vessel is equal to the setpoint pressure, the weight of the weight plus the magnetic core balances the pressure that results from the rate at which the gas is flowing through the exhaust orifice without powering the magnetic attraction member.

9. A pressure regulation device for regulating pressure in a vessel containing a liquid surmounted by a pressurizing gas, having a gas feed orifice for feeding the vessel with gas at a given flow rate and a gas exhaust orifice, the device comprising a pressure modulation member which is controlled by a control unit so as to modulate only an exhaust flow rate through the exhaust orifice as a function of a difference relative to a setpoint pressure stored in the control unit, the feed flow rate being unmodulated;
   wherein the modulation member comprises a valve member disposed over a valve seat surrounding the exhaust orifice;
   wherein the valve member is connected to a control member;
   wherein the control member comprises a magnetic core fastened to the valve member and associated with a magnetic attraction member;
   wherein the magnetic core comprises two permanent magnets having poles of the same polarity facing each other, each having a field that is coaxial with the magnetic attraction member.

10. A pressure regulation device for regulating pressure in a vessel containing a liquid surmounted by a pressurizing gas, having a gas feed orifice for feeding the vessel with gas at a given flow rate and a gas exhaust orifice, the device comprising a pressure modulation member which is controlled by a control unit so as to modulate only an exhaust flow rate through the exhaust orifice as a function of a difference relative to a setpoint pressure stored in the control unit, the feed flow rate being unmodulated;
   wherein the modulation member comprises a valve member disposed over a valve seat surrounding the exhaust orifice;
   wherein the valve member is connected to a control member;
   wherein the control member comprises a magnetic core fastened to the valve member and associated with a magnetic attraction member;
   wherein the magnetic core comprises two permanent magnets having poles of the same polarity facing each other, each having a field that is coaxial with the magnetic attraction member; and
   wherein the magnetic attraction member is a coil and wherein the valve member and the associated magnetic core are dimensioned so that in the absence of electric current and for a pressure in the vessel that is equal to the setpoint pressure, the core is in a position for which the midplane between the facing poles of the magnets coincides with a mid-height plane of the coil.

* * * * *